United States Patent [19]

Maniquis

[11] 4,278,543
[45] Jul. 14, 1981

[54] ROTARY SIEVE FOR SEPARATION OF SOLIDS FROM LIQUIDS

[75] Inventor: Dux C. L. Maniquis, Sydney, Australia

[73] Assignee: Alchaldean International Pty. Limited, Blakehurst, Australia

[21] Appl. No.: 127,420

[22] Filed: Mar. 5, 1980

[30] Foreign Application Priority Data

Mar. 5, 1979 [AU] Australia ............................ PD7888

[51] Int. Cl.³ ............................................ B01D 33/06
[52] U.S. Cl. .................................. 210/403; 209/244; 209/284; 210/456
[58] Field of Search ........................ 209/240, 243–246, 209/270, 284, 288; 210/402, 403, 456, 497 R

[56] References Cited

U.S. PATENT DOCUMENTS

| | | | |
|---|---|---|---|
| 292,947 | 2/1884 | Porter et al. ........................ | 210/403 |
| 962,168 | 6/1910 | Scholl ................................. | 210/403 |
| 2,748,951 | 6/1956 | Dubach .............................. | 210/403 |
| 2,758,722 | 8/1956 | Murray ........................... | 210/403 X |
| 3,876,548 | 4/1975 | Welles, Jr. ...................... | 210/402 X |

*Primary Examiner*—William A. Cuchlinski, Jr.
*Attorney, Agent, or Firm*—Stevens, Davis, Miller & Mosher

[57] ABSTRACT

Means to feed material to be sieved into the receiving end of an open-ended, substantially horizontal, rotary sieving sleeve, comprise a trunk disposed coaxially with the sleeve and having a material-receiving end outside the sleeve and the other end portion projecting into the sleeve by an amount equal to from one half to one quarter the length of the sleeve. The portion of the trunk within the sleeve has a material departure aperture formed in the top of that portion. This aperture is in the form of a horizontal weir which extends axially of said portion for a distance at least equal to half the axial length of said portion measured from the innermost end thereof.

2 Claims, 4 Drawing Figures

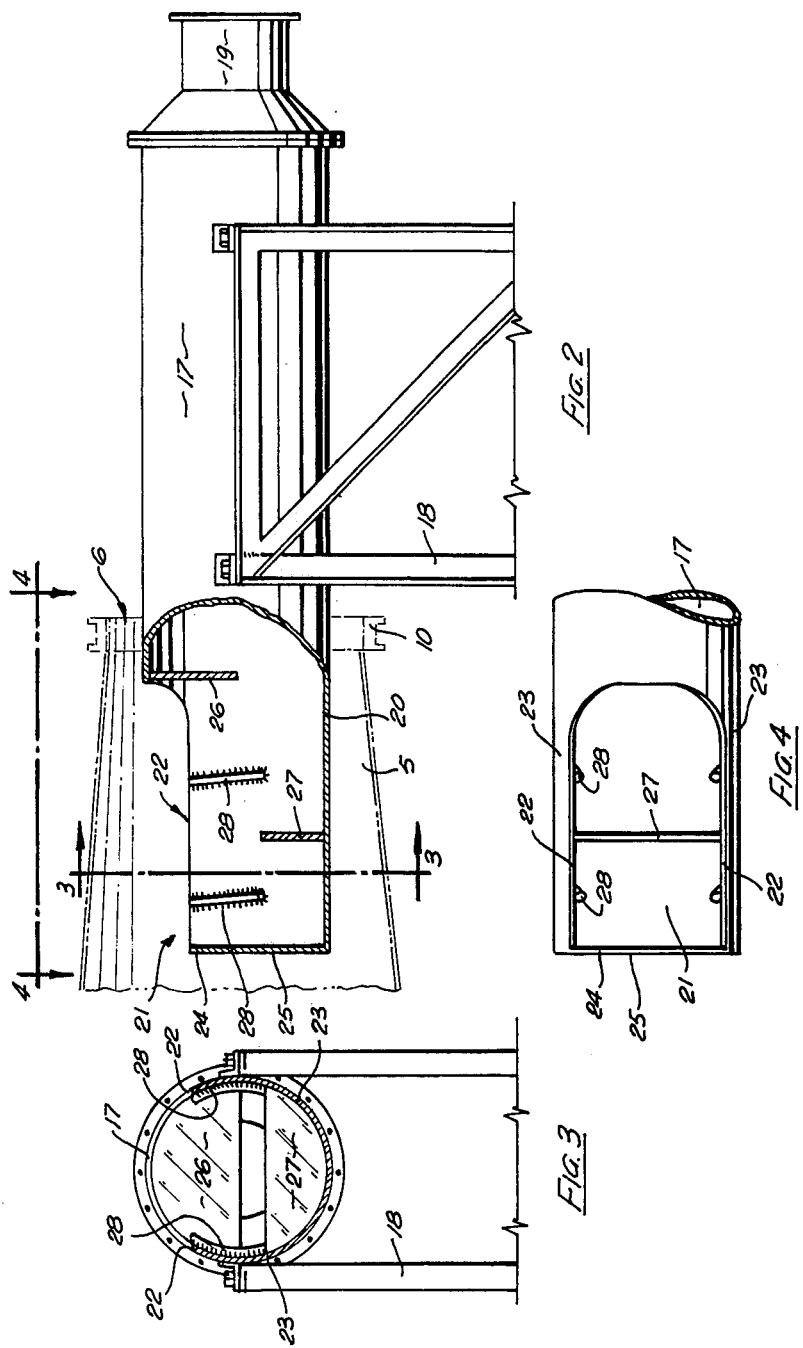

ROTARY SIEVE FOR SEPARATION OF SOLIDS FROM LIQUIDS

This invention relates to rotary sieve apparatus for the separation of solids from a liquid in which the solids are suspended. The invention is applicable to separation of solids from liquids in the treatment of sanitary sewage, abattoirs' wastes, meat packaging residues and many others.

It is already well known to separate solids from liquids in rotary sieves comprising an open-ended, screening sleeve disposed and rotatable about a horizontal axis. The fluent matter to be treated is introduced at one end of the sleeve, the liquid falls through the screen interstices, and the solids are expelled from the sleeve at its opposite ends.

It is also known to use, as the screening cylindrical wall of the sleeve, a multiplicity of closelyspaced, parallel "wedge-wires" which extend longitudinally of the sleeve, and a plurality of circular binder hoops which encircle the array of wedge-wires, and to which all of the wires are joined. The screening sleeve may take many different forms; for example, the binder "hoops" may be formed as a single spring-like helix. Again, in some reverse flow sieve apparatus of the kind under discussion (see U.S. Pat. No. 3,876,548—Donald P. Welles—for example) the medium to be separated is applied to the outside of the sleeve so that the solid matter departs externally of the sleeve and the liquid penetrates the screen by passing from the outside to the interior of the sleeve. In this example the "wedge-wires" may run longitudinally or circumferentially of the sleeve, if desired they may be in the form of a closely wound helix. In each of these known forms however, the wedge-wire principle is employed.

The term "wedge-wire" is something of a misnomer since the wires are better described as being of trapezoidal cross-sectional shape. Be that as it may, the principle is a known one having been customarily used for the bars of man-hole and drainage gratings and in other ways where it is required for a liquid to run through an apertured plate or screen, and solids suspended in the arriving liquid (being over an acceptable minimum size) are to be prevented from going through the screen. This is done so that if a particle of acceptable small size can negotiate the entrance end of a screen-hole then it is assured of ample mechanical clearance during the remainder of its passage through that increasingly widening hole; thus to ensure, as far as possible, against blinding of the screenhole by the particle.

The present invention is concerned only with wedge-wire screen-sleeves of the kind in which the fluent matter to be separated is fed to the interior of the screen-sleeve, the solids leave the screen axially of the sleeve and the liquids depart radially outwardly. Because of this, the remainder of this discussion will be confined to the use of screen-sleeves of that type.

It will be appreciated that in any screensleeve it is desirable for the total screen-hole area to be as great as possible, compared with the un-holed area, so as to provide maximum get-away passage for the liquid. The wedge-wire principle of screen-sleeve construction is particularly effective in this respect, since the holes are virtually continuous throughout the length of the sleeve; that continuity being curtailed to only a slight extent due to the presence of the support hoops.

Experience has shown that internally-fed wedgewire screens of the kind discussed above are about the most efficient kind of rotary sleeve sieve now in use in the art, however, my work has shown that this efficiency is not generally being fully realized, and this, I have found, is due to insufficiently widespread deposit of matters to be treated on the screening surface.

The object of this invention is to ameliorate the mentioned shortcoming.

The invention provides a sieve of the kind comprising:

an open-ended wedge-wire sleeve having a receiving end and a solids departure end, and having its longitudinal axis disposed substantially horizontally, means to rotate said sleeve about that axis, and means for infeed of material to be sieved into the sleeve by way of said receiving end; characterized in that said infeed means comprise:

a trunk disposed co-axially with the sleeve, having one end outside the sleeve through which material to be sieved is delivered into said trunk and an opposite end portion which projects into and through the receiving end of the sleeve to extend within the sleeve over a distance equal to from one quarter to one half the axial length of the sleeve, and a material departure aperture in the top of said end portion bordered by a horizontal wire extending axially of said end portion for a distance at least half the axial length of that portion measured from the innermost end of said portion.

An example of the invention is illustrated in the drawings herewith.

FIG. 2 is a partly sectioned side elevation of an infeed trunk.

FIG. 3 is a sectional end elevation taken on line 3—3 in FIG. 2.

FIG. 4 is a partial plan taken on line 4—4 in FIG. 2.

Figure 1:
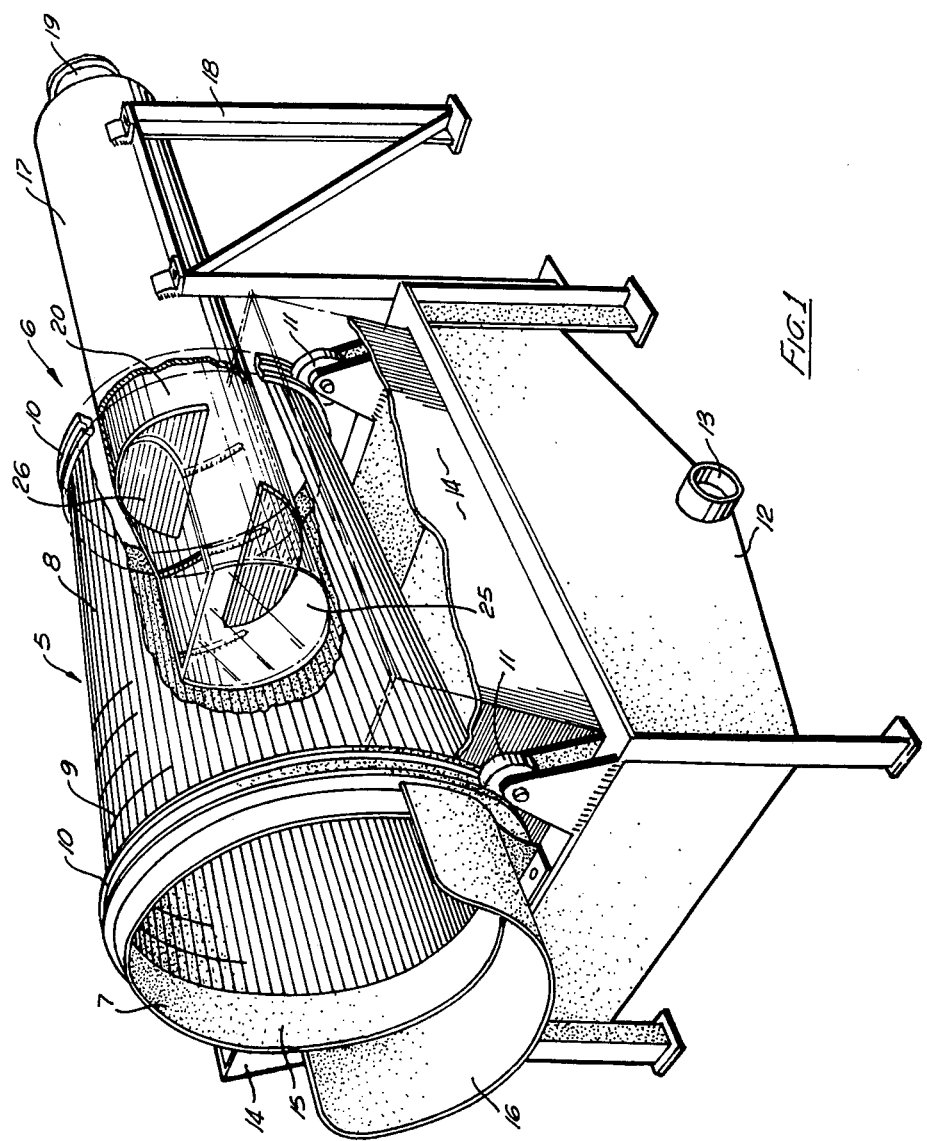
FIG. 1 is a perspective view of a wedge-wire sieve with some parts broken away.

The illustrated sieve comprises an open-ended wedge-wire sleeve 5 having a receiving end 6 and a solids departure end 7. The sleeve may be cylindrical, or it may be acutely frustro-conical as indicated by dotted lines in FIG. 2. Its longitudinal axis may be absolutely horizontal, or it may be virtually horizontal by reason of its axis tilting slightly downwardly towards the departure end of the sleeve.

In this case, the sleeve consists of closelyspaced longitudinally extending wedge-wires 8 circumferentially bound by hoop-wires 9 secured about the wedge-wires by welding.

Means to rotate the sleeve comprise grooved runner-rings 10 which rest on rollers 11 and a motor (not shown) drive connected to the sleeve, or to one or more of the rollers 11, in conventional manner.

Liquids and sieve permitted fine solids leave the sleeve radially to fall into catchment sump 12 furnished with drain 13 and having splash-guards 14. Sieve-discriminated solids leave the sleeve by way of end-ring 15 which discharges onto stationarily mounted spout 16.

The infeed means whereby matters to be sieved are deposited in the sleeve consist of a trunk 17 mounted on supports 18 so that it is substantially in axial coincidence with the sleeve. This trunk has one end 19, outside the sleeve, equipped for delivery, to the trunk, of matter to be sieved, in conventional manner.

Trunk 17, at its opposite end, has an end portion 20 whereof the length is about equal to that of the trunk fragment illustrated in FIG. 4. End portion 20 extends inwardly of the sleeve by an amount equal to from one quarter to one half the axial length of the sleeve. The top of portion 20 has a material departure aperture 21 bordered and defined by a horizontal weir constituted by the upper edges 22 of end portion side walls 23 and the upper edge 24 of end portion inner end wall 25. Aperture 21 preferably extends axially of end portion 20 for as much of the full length of that portion as is compatible with matters welling out of the aperture not escaping through the receiving end 6 of sleeve 5. At its minimum length, aperture 21 is at least equal in length to one half the axial length of end portion 20 measured from end wall 25.

End portion 20 preferably includes at least one "upstream" anti-surge baffle plate 26 which extends laterally of portion 20 and from the top of that portion towards the centre thereof, and at least one "downstream" anti-surge baffle plate 27 which extends laterally of portion 20 and from the bottom of that portion towards the centre thereof. Portion 20 also preferably includes a plurality of part-helical flow guide ribs 28 which are near vertical but incline slightly so that their upper ends are closer to the weir end edge 24. With regard to ribs 28 I have found that their presence tends to stabilize evenness of flow over the weir edges 22 and 24. Ribs 28 are secured to the end portion side walls, by welding or otherwise, so that their upper ends are substantially flush with weir edges 22.

I claim:

1. A sieve of the kind comprising:
an open-ended wedge-wire sleeve having a receiving end and a solids departure end, and having its longitudinal axis disposed substantially horizontally, means to rotate said sleeve about that axis, and means for infeed of material to be sieved into the sleeve by way of said receiving end; said infeed means comprising:
a trunk disposed co-axially with the sleeve, having one end outside the sleeve through which material to be sieved is delivered into said trunk and an opposite end portion which projects into and through the receiving end of the sleeve to extend within the sleeve over a distance equal to from one quarter to one half the axial length of the sleeve, and a material departure aperture in the top of said end portion bordered by a horizontal weir extending axially of said end portion for a distance at least half the axial length of that portion measured from the innermost end of said portion; said end portion being internally furnished with at least one upstream anti-surge baffle plate which extends laterally of said end portion and from the top of that portion towards the center thereof, and at least one downstream anti-surge baffle plate which extends laterally of said end portion and from the bottom of that portion towards the center thereof.

2. A sieve of the kind comprising:
an open-ended wedge-wire sleeve having a receiving end and a solids departure end, and having its longitudinal axis disposed substantially horizontally, means to rotate said sleeve about the axis, and means for infeed of material to be sieved into the sleeve by way of said receiving end, said infeed means comprising:
a trunk disposed co-axially with the sleeve, having one end outside the sleeve through which material to be sieved is delivered into said trunk and an opposite end portion which projects into and through the receiving end of the sleeve to extend within the sleeve over a distance equal to from one quarter to one half the axial length of the sleeve, and a material departure aperture in the top of said end portion bordered by a horizontal weir extending axially of said end portion for a distance at least half the axial length of that portion measured from the innermost end of said portion, said end portion being internally furnished with a plurality of part-helical flow guide ribs mounted on the side-walls of said end portion so that their upper ends are closer to the weir end wall and substantially flush with the weir sides defined by said side-walls.

* * * * *